(12) United States Patent
Bologna

(10) Patent No.: US 6,513,401 B2
(45) Date of Patent: Feb. 4, 2003

(54) TRANSMISSION UNIT FOR AXLES FOR VEHICLES WITH ELECTRIC DRIVE

(75) Inventor: Luciano Bologna, Rivoli (IT)

(73) Assignee: Graziano Trasmissioni S.p.A. (IT)

( * ) Notice: Subject to any disclaimer, the term of this patent is extended or adjusted under 35 U.S.C. 154(b) by 0 days.

(21) Appl. No.: 09/768,519

(22) Filed: Jan. 24, 2001

(65) Prior Publication Data

US 2001/0010177 A1 Aug. 2, 2001

(30) Foreign Application Priority Data

Feb. 2, 2000 (IT) .......................... T000A0101

(51) Int. Cl.[7] .......................... F16H 57/12; F16H 57/02
(52) U.S. Cl. .......................... 74/397; 74/325; 74/421 R
(58) Field of Search ................ 74/325, 397, 421 R, 74/421 A, 606 R

(56) References Cited

U.S. PATENT DOCUMENTS

| | | | | |
|---|---|---|---|---|
| 1,704,890 A | * | 3/1929 | Gerson | 74/325 |
| 1,799,100 A | * | 3/1931 | Keil | 74/397 |
| 1,887,832 A | * | 11/1932 | Brown | 74/15.66 |
| 2,051,568 A | * | 8/1936 | Morehouse | 74/325 |
| 3,024,326 A | * | 3/1962 | Wischhusen | 200/19.26 |
| 3,178,954 A | * | 4/1965 | Whiting | 74/325 |
| 3,286,994 A | * | 11/1966 | Manna | 366/285 |
| 3,783,710 A | * | 1/1974 | Steinhagen | 418/199 |

FOREIGN PATENT DOCUMENTS

GB 550667 * 1/1943 .................. 74/397

* cited by examiner

Primary Examiner—David Fenstermacher
(74) Attorney, Agent, or Firm—Cook, Alex, McFarron, Manzo, Cummings & Mehler, Ltd.

(57) ABSTRACT

A transmission unit for axles for vehicles with electric drive comprises a drive gear, a driven gear, and an intermediate idler gear, meshing with the drive gear and with the driven gear. The unit is housed in half-shells. The intermediate idler gear is mounted on a pin, the central portion of which is eccentric by a predetermined amount with respect to the axis extending through the end portions of the pin, which are engaged in the half-shells. Angularly spaced radial holes are formed in one end portion of the pin and are selectively enagagable by a resilient split pin which extends through a radial hole formed in one of the half-shells.

5 Claims, 4 Drawing Sheets

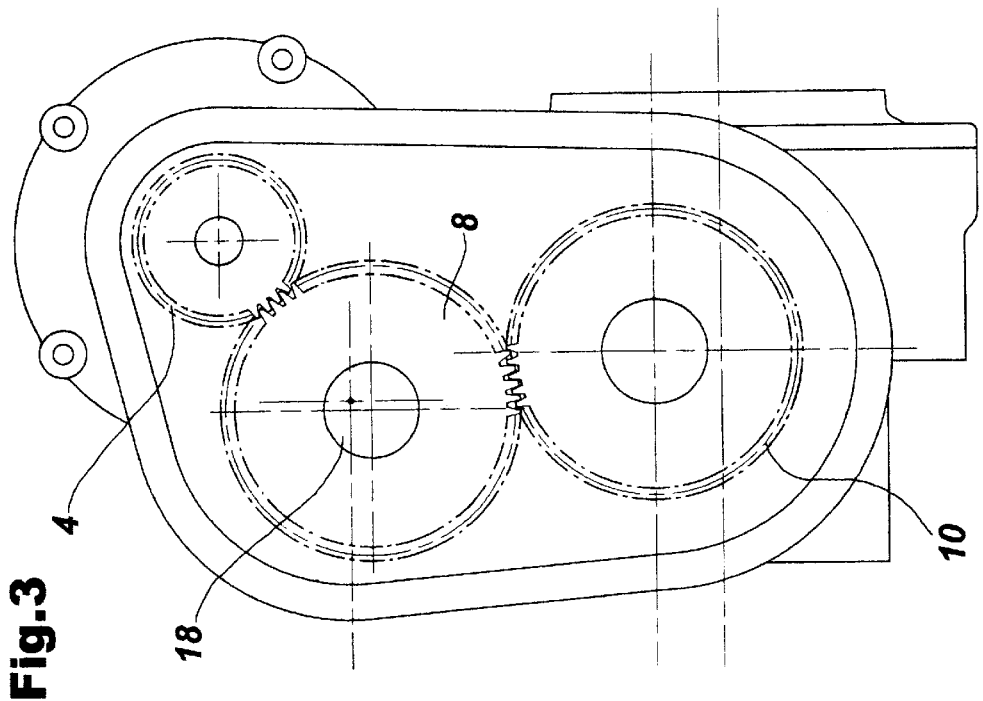
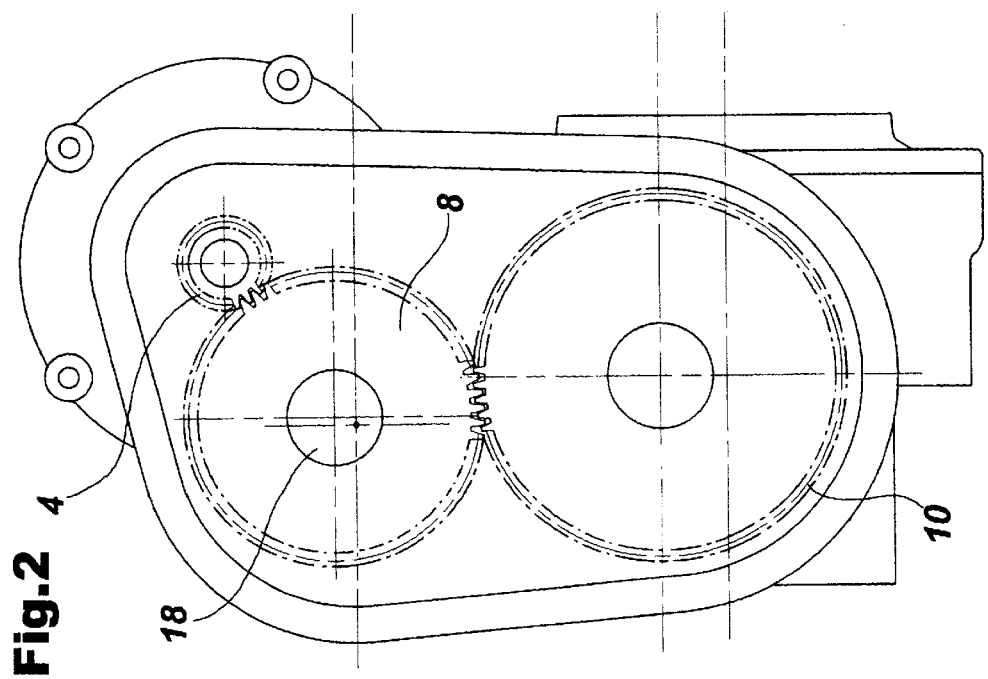

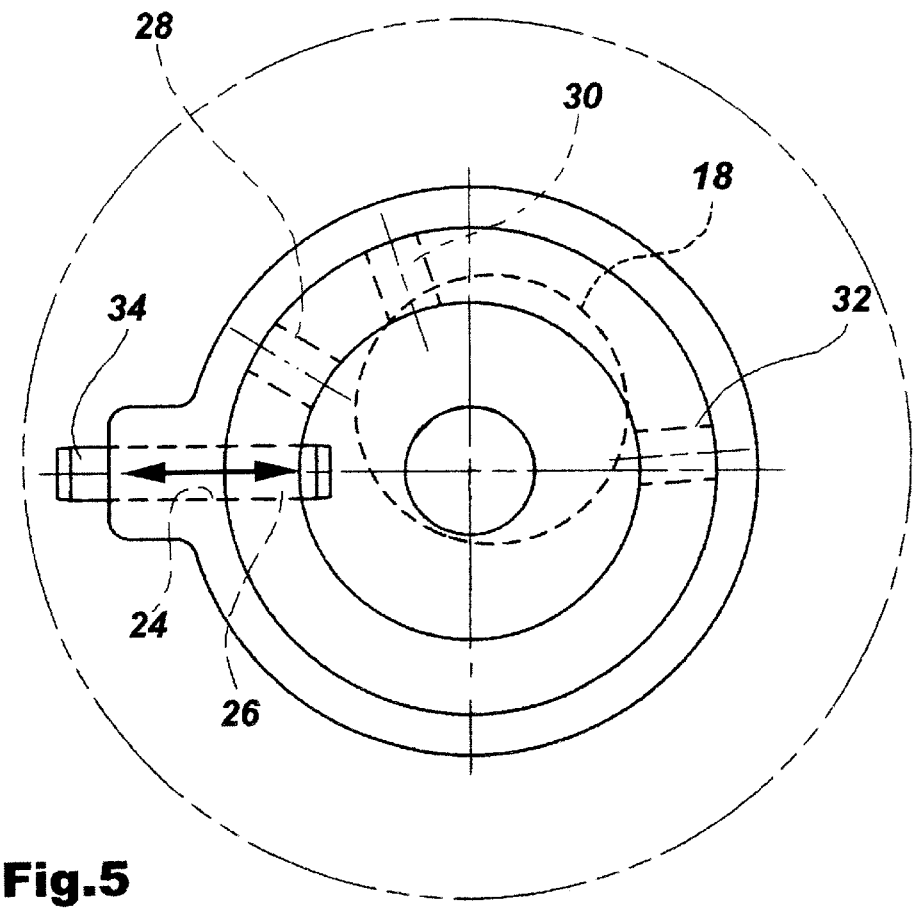
Fig.5
Fig.6
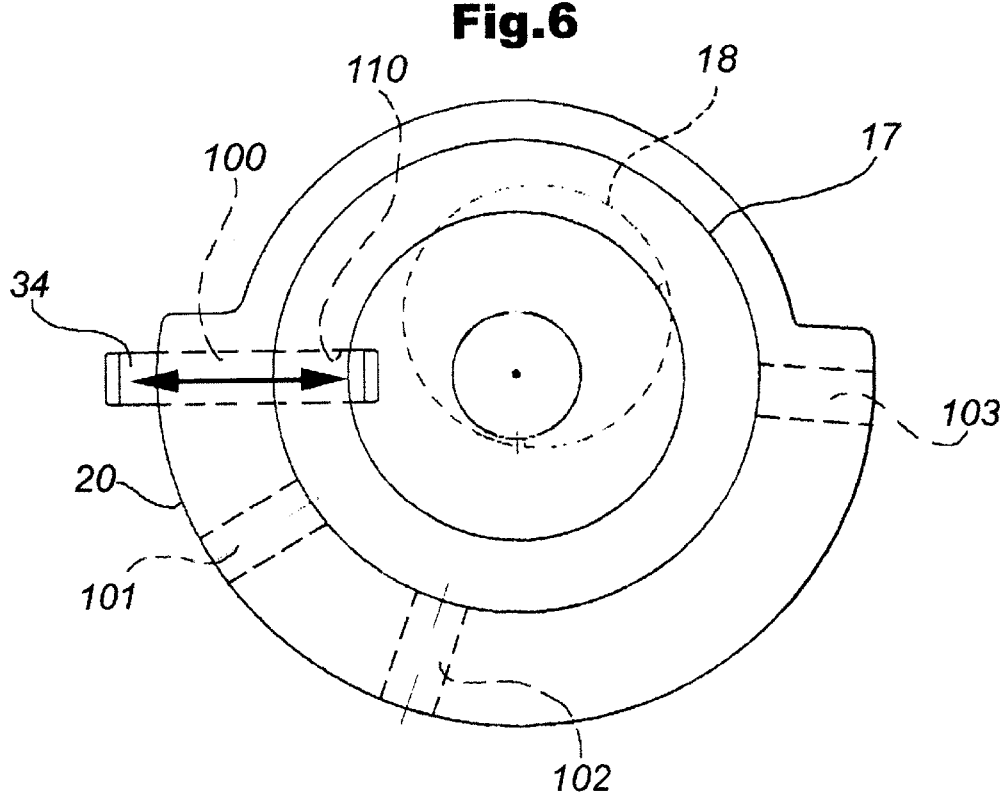

TRANSMISSION UNIT FOR AXLES FOR VEHICLES WITH ELECTRIC DRIVE

BACKGROUND OF THE INVENTION

1. Field of the Invention

The present invention relates to a transmission unit for axles for vehicles with electric drive.

2. Description of the Related Art

Vehicles with electric drive are used in various application, such as for example, for moving luggage in railway stations and/or airport facilities, for transporting people on golf courses, etc.

The transmission unit for such a vehicle is normally composed of a train of gears. In this train of gears, a drive gear takes the drive from the shaft of an electric motor and transmits it to the driven gear which in turn transmits the drive to the wheel axle of the vehicle. In some cases, an intermediate idler gear is interposed between the drive gear and the driven gear. The unit is housed in a gear housing.

Since each of the possible uses of above-mentioned electric-drive vehicles may require a different transmission ratio, it is normally necessary to provide different drive, driven and idler gears for each type of use, and possibly also a different transmission housing.

The object of the present invention is to provide a transmission unit for axles for vehicles with electric drive which overcomes the above-mentioned problems and which is of simple construction and low cost.

SUMMARY OF THE INVENTION

The present invention achieves the above-mentioned object by means of a transmission unit for axles for vehicles with electric drive having a drive gear, a driven gear, and an intermediate idler gear meshing with the drive gear and with the driven gear, the gears being housed in half-shells, the intermediate idler gear being mounted rotatable on an intermediate or central portion of a pin having two end portions rotatably supported in the half-shells about a common axis, the central portion of the pin being eccentric by a predetermined amount with respect to the common axis; and means being provided for locking the pin in different angular positions about the common axis, with respect to the half-shells.

In a further embodiment, the locking means comprise a plurality of angularly spaced radial holes formed in one end portion of the pin, and a locking member extending through a radial hole formed in one half-shell and one of the radial holes of the pin.

In yet another embodiment, the locking means comprise a plurality of angularly spaced radial holes formed in one of the half-shells, and a locking member which extends through one of the radial holes and through a radial hole formed in one end portion of the pin.

In still a further embodiment, the locking member is a resilient split pin.

BRIEF DESCRIPTION OF THE DRAWINGS

The invention will now be described with reference to the appended drawings, provided purely by way of non-limiting example, in which:

FIGS. 2, 3 and 4 are side view of the transmission unit of the present invention, FIG. 5 shows the details of FIG. 4, on an enlarged scale, and FIG. 6 shows, on an enlarged scale, details of a second embodiment of the transmission unit of the present invention.

DETAILED DESCRIPTION OF THE PRESENTLY PREFERRED EMBODIMENTS

Figure 1:
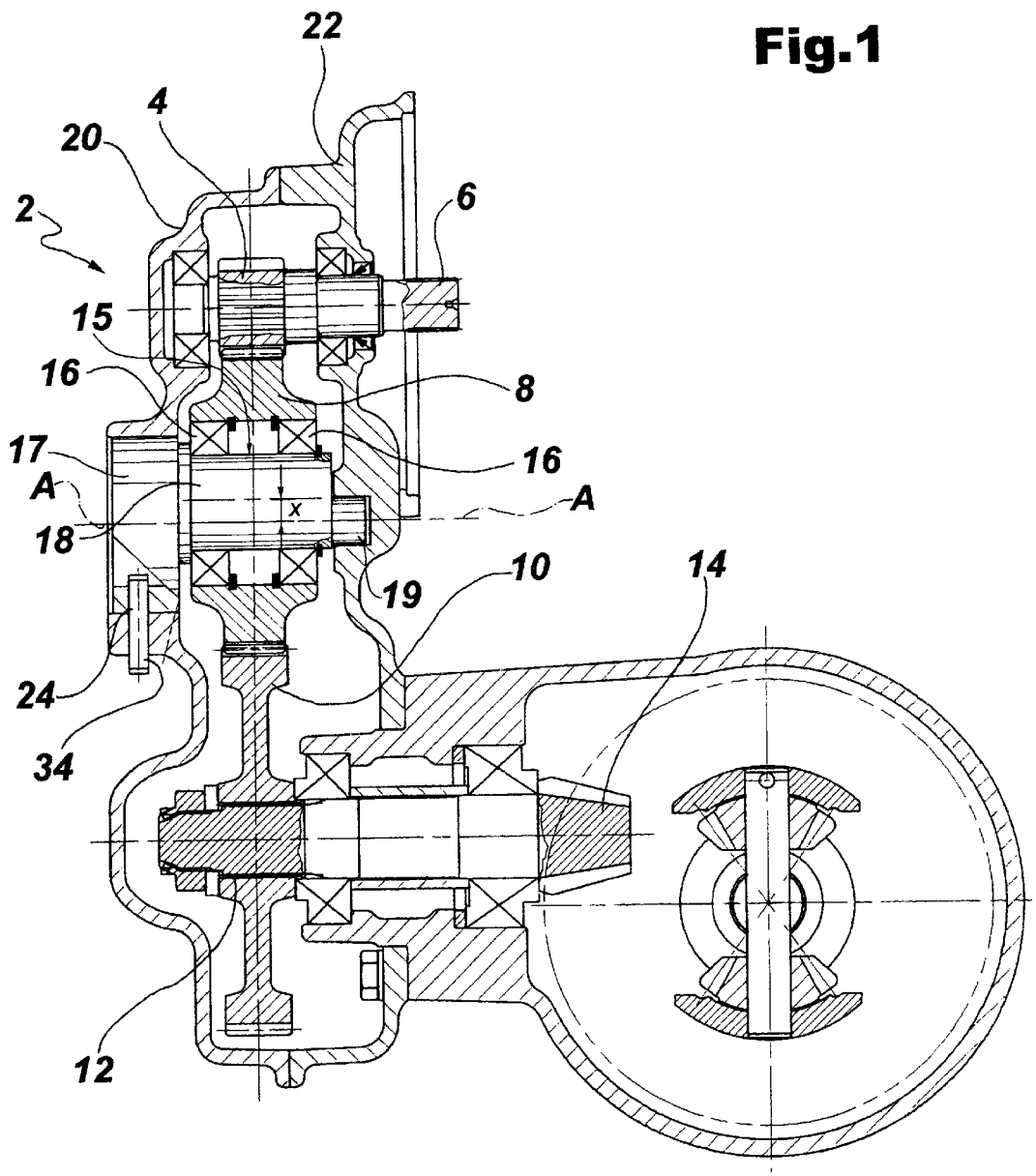
FIG. 1 shows a sectional view of the transmission unit of the present invention.

With reference to FIG. 1, a transmission unit 2 comprises a drive gear 4 which takes the drive from the shaft of an electric motor (not shown) by way of a splined coupling member 6. The drive gear 4 meshes with an intermediate idler gear 8 which in turn meshes with a driven gear 10, keyed to a bevel pinion 14 by way of a splined coupling 12.

The transmission unit 2 is supported in a housing composed of two half-shells 20 and 22.

The idler gear 8 is mounted, by way of bearings 16, on a central portion 18 of a pin 15, which is eccentric by a predetermined amount X with respect to the common rotation axis A—A of the two end portions 17, 19 of said pin, which are engaged in the half-shells 20 and 22.

Figure 4:
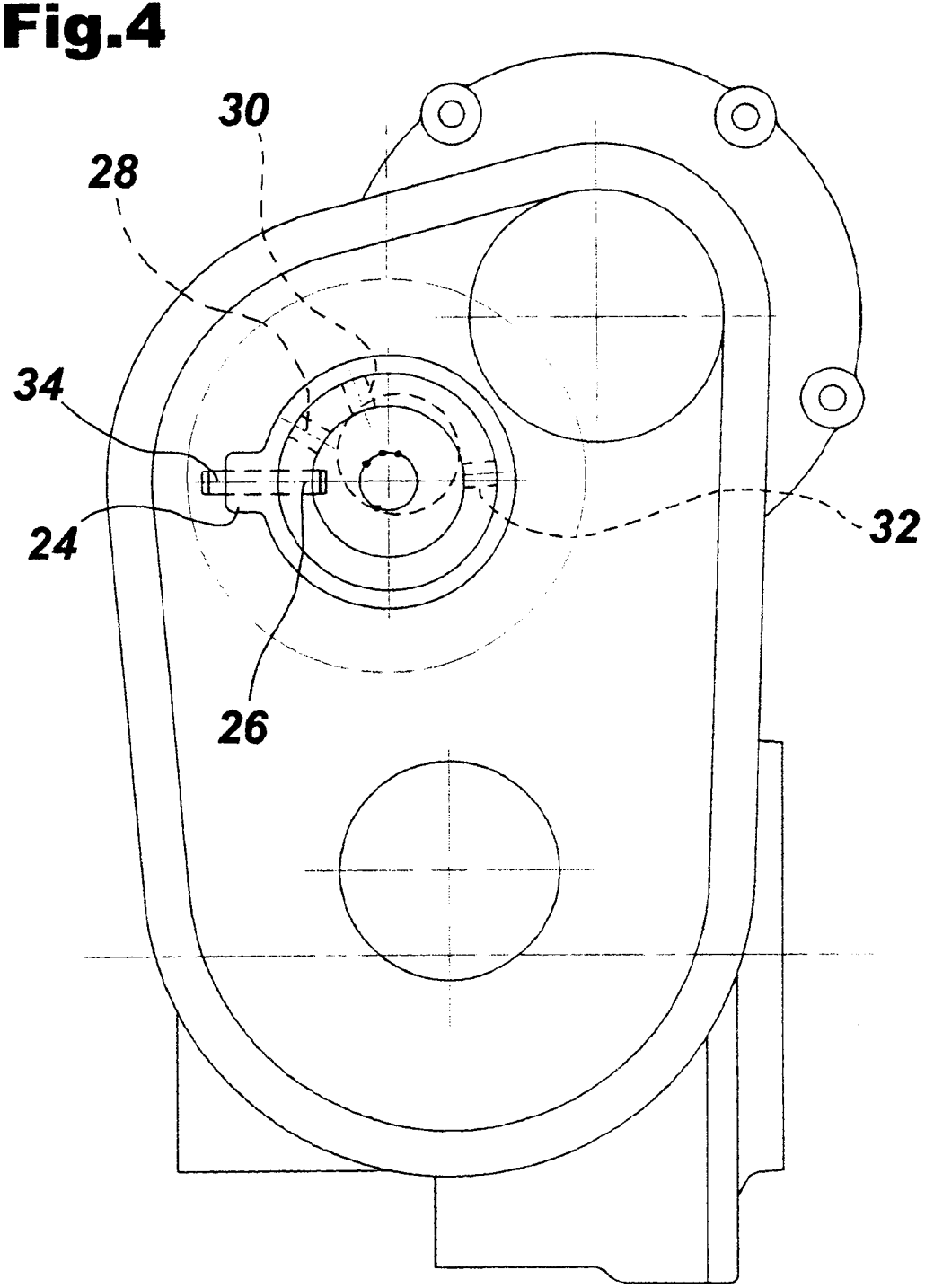

A radial through-hole 24 is formed in the half-shell 20. Radial holes 26, 28, 30, 32, formed in one end portion 17 of the pin 15 (FIGS. 4 and 5) are spaced apart angularly for reasons which will be explained below, and can be engaged by a resilient split pin 34 introduced into the radial hole 24.

To change the transmission ratio, it is sufficient to replace the drive gear 4 and the driven gear 10 with others having the desired transmission ratio and to displace the axis of rotation of the idler gear 8 to a position such that the drive and driven gears can be engaged. For this purpose, the axis of the central eccentric portion 18 of the pin 15 is displaceable by rotating the pin about the common rotation axis A—A of the end portions 17, 19, thereof until the desired position is reached, i.e., until one of the holes 26, 28, 30 or 32 is placed into alignment with the radial hole 24. Then, pin 34 is inserted, thus fixing the axis of rotation of the idler gear 8 in the desired position.

In a second embodiment of the transmission unit according to the invention, shown in FIG. 6, angularly spaced radial holes 100, 101, 102, 103 are formed in the half-shell 20, and a radial hole 110 is formed in the end portion 17 of the pin.

In this embodiment, in order to vary the transmission ratio, it is necessary to rotate the axis of the eccentric central portion 18 of the pin until the desired position is reached, thus placing the hole 110 in alignment with one of the radial through-holes 100, 101, 102, 103. Then, pin 34 is inserted through the aligned holes, thus fixing the axis of the idler gear 8 in the desired position.

In the embodiment shown in FIG. 5, there are four possible, different transmission ratios. Naturally, if the number of holes in one end of the pin is increased, the number of transmission ratios which can be achieved is consequently increased. The same result is achieved in the embodiment of FIG. 6 by increasing the number of through-holes formed in the half-shell 20.

The advantages of a transmission unit according to the invention are clear from the foregoing. The transmission ratios can be varied whilst the intermediate idler gear remains unchanged, as shown by the comparison of FIGS. 2 and 3, with clear management and cost benefits. Since the housing which contain the gear train do not need to be changed, further management and cost benefits result. Additionally, in order to change the transmission ratios, instead of replacing all three gears as in the prior art, it is sufficient with the invention to replace the drive gear (on the electric motor shaft) and the driven gear mounted on the shaft of the bevel pinion.

Naturally, the principle of the invention can remain the same, while the forms of embodiment and details of construction may be varied widely, without thereby departing from the scope of the present invention.

What is claimed is:

1. A transmission unit for axles for vehicles with electric drive, comprising a drive gear, a driven gear, and an intermediate idler gear meshing with the drive gear and with the driven gear, the gears being housed in half-shells, the intermediate idler gear being mounted rotatable on an intermediate or central portion of a pin having two end portions rotatably supported in said half-shells about a common axis, the central portion of the pin being eccentric by a predetermined amount with respect to said common axis; means being provided for locking the pin in different angular positions about said common axis, with respect to said half-shells.

2. A transmission unit for axles according to claim 1, wherein said locking means comprise a plurality of angularly spaced radial holes formed in one end portion of the pin, and a locking member extending through a radial hole formed in one half-shell and one of said radial holes of the pin.

3. A transmission unit for axles according to claim 1, wherein said locking means comprise a plurality of angularly spaced radial holes formed in one of the half-shells, and a locking member which extends through one of the said radial holes and through a radial hole formed in one end portion of the pin.

4. A transmission unit according to claim 2 or 3, wherein the locking member is constituted by a resilient split pin.

5. A transmission unit according to claim 3, wherein the locking member is a resilient split pin.

* * * * *